US006749961B1

(12) United States Patent
Nguyen et al.

(10) Patent No.: US 6,749,961 B1
(45) Date of Patent: Jun. 15, 2004

(54) SHUTDOWN BATTERY SEPARATOR MADE WITH A BLEND OF POLYMER AND OLIGOMER

(75) Inventors: Khuy V. Nguyen, Charlotte, NC (US); C. Glen Wensley, Rock Hill, SC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/546,262

(22) Filed: Apr. 10, 2000

(51) Int. Cl.[7] .......................... H01M 2/16; H01M 10/50
(52) U.S. Cl. .......................... 429/145; 429/142; 429/57; 429/62
(58) Field of Search ..................... 429/57, 62, 142, 429/145

(56) References Cited

U.S. PATENT DOCUMENTS

| 4,331,622 | A |   | 5/1982 | Doi et al. |
| 4,650,730 | A |   | 3/1987 | Lundquist et al. |
| 5,091,272 | A |   | 2/1992 | Treger |
| 5,922,492 | A | * | 7/1999 | Takita et al. ............ 429/249 |

FOREIGN PATENT DOCUMENTS

| EP | 0603500 |   | 6/1994 |
| EP | 0942480 |   | 9/1999 |
| EP | 0951080 |   | 10/1999 |
| JP | 8-20659 |   | 1/1996 |
| JP | 11-240970 A | * | 9/1999 |
| WO | WO 93/13565 |   | 7/1993 |

* cited by examiner

Primary Examiner—Susy Tsang-Foster
(74) Attorney, Agent, or Firm—Robert H. Hammer, III, P.C.

(57) ABSTRACT

The instant invention is directed to a battery separator including a microporous polyolefinic membrane having a porosity in a range 30–80%, an average pore size in a range of 0.02–2.0 microns, and being made from a blend of a polyolefin polymer and an oligomer of a polyolefinic polymer.

9 Claims, No Drawings

SHUTDOWN BATTERY SEPARATOR MADE WITH A BLEND OF POLYMER AND OLIGOMER

FIELD OF THE INVENTION

A shutdown separator for an electrochemical cell and the battery made therefrom are disclosed herein.

BACKGROUND OF THE INVENTION

In lithium ion rechargeable batteries, shutdown separators are used as part of the overall battery safety system. Specifically, there is a need, in these batteries, to prevent, or substantially reduce the likelihood of, thermal runaway which may arise from short circuiting caused by, for example, physical damage, internal defect, or overcharging. Shutdown separators, typically used in lithium ion rechargeable cells, will shutdown (i.e., sufficient pore closure to substantially stop ion or current flow within the cell) around 130° C. (the approximate melting temperature of polyethylene).

Battery producers wish to have separators that shutdown at even lower temperatures for increased safety. To that end, several alternatives have been proposed, but none, apparently, have displaced the separators with 130° C. shutdown. Those alternatives include multilayer separators having a particle stretch membrane or a phase inversion membrane. Both have shutdown temperatures below 130° C.

Accordingly, there is an ongoing need for a low temperature shutdown separator.

SUMMARY OF THE INVENTION

The instant invention is directed to a battery separator including a microporous polyolefinic membrane having a porosity in a range of 30–80%, an average pore size in a range of 0.02–2.0 microns, and being made from a blend of a polyolefin polymer and an oligomer of a polyolefinic polymer.

DETAILED DESCRIPTION OF THE INVENTION

The instant invention is directed to a separator for a battery (or cell). The battery may be any battery that would benefit from the use of a separator having the ability to shutdown the ion (or current) flow between the battery's anode and cathode in response to a short circuit. An example of such a battery is a lithium battery, particularly a lithium ion rechargeable battery.

A battery typically comprises an anode, a cathode, a separator sandwiched between the anode and the cathode, an electrolyte in ionic contact with the anode and the cathode via the separator, and a package (e.g. a can or a foil bag) which contains the anode, the cathode, the separator, and the electrolyte. For convenience, the invention will be described with reference to a lithium ion rechargeable cell having a liquid organic electrolyte, but the invention is not so limited.

The separator is a microporous membrane. It may be a single ply or multi-ply membrane. All separators should have sufficient mechanical strength to withstand the rigors of battery manufacture and battery use. Additionally, the separator should have sufficient thermal stability and shutdown capability. Thermal stability refers to the membrane's ability to substantially maintain its physical dimension during the abnormal conditions associated with thermal runaway (e.g. tolerable shrinkage at elevated temperature, and able to prevent physical contact of anode and cathode at elevated temperature). Shutdown capability refers to the membrane's ability to substantially close its pores, through which the electrolyte's ions conduct current flow between the anode and the cathode, as a result of thermal runaway. Shutdown should occur at a temperature of less than 130° C. (this will be illustrated in greater detail below), and shutdown should occur sharply (e.g. the breadth of temperature response for shutdown is narrow, about 4–5° C.). A microporous membrane preferably has a shutdown temperature of less than about 130° C.

In the case of the single ply separator, mechanical strength, thermal stability, and shutdown capability all reside in the single ply.

In the case of a multi-ply separator, two or more (preferably three) microporous membranes comprise the separator. Typically, at least one membrane provides sufficient mechanical strength and thermal stability, while another membrane provides the shutdown capability. A multi-ply separator may be made in any number of ways, but preferably by making individual membranes which are subsequently bonded together for example, by lamination (i.e., heat and/or pressure), or by coextrusion. In the former, individual membranes may be either microporous or non-porous prior to bonding. The microporous membranes having suitable thermal stability may be made, for example, by either a dry stretch or solvent extraction method. Such membranes are commercially available from, for example, Celgard Inc., Charlotte, N.C., Asahi Chemical Industry, Ltd., Tokyo, Japan, and Tonen Corporation of Tokyo, Japan. The microporous membrane having suitable shutdown capability is the instant invention.

The separator, e.g. for a lithium ion rechargeable battery, has a thickness less than 3 mils (75 microns) and, preferably, a thickness in the range of 3 to 75 microns and, most preferably, in the range of 5 to 37 microns. The separator has porosity in the range of 30 to 80%, preferably, in the range of 35 to 60%. The pore size is in the range of 0.02 to 2.0 microns, preferably, 0.04 to 0.5 microns. The separator has a Gurley Number of 1 to 150 seconds, preferably, 7 to 80 seconds. (Gurley number as used herein refers to the amount of time for 10 cc of air at 12.2 inches of water to pass through one square inch of membrane.)

The inventive microporous polyolefinic membrane is made from a blend of a polyolefin polymer and an oligomer of a polyolefinic polymer. Polymer, as used herein, refers to a long chain molecular structure in which the addition or deletion of monomers does not significantly impact its physical properties. An oligomer, as used herein, refers to a short chain polymer whose properties change with the addition or removal of the repeating units (or monomer). The oligomer does not have to be made from the same repeating units (or monomer) as the polymer. The polymer contemplated for use in the instant application refer to ones based on $C_1$–$C_7$ repeating units (or monomer). Likewise, the oligomer contemplated for use herein refer to $C_1$–$C_7$ based monomers. Polymers include polyethylene, polypropylene, polybutylene, and polymethylpentene. Polyethylene is preferred, and high density polyethylene (HDPE) is most preferred. The preferred oligomer includes polyethylene wax having a molecular weight of less than 6000. Most preferred is a polyethylene wax having a molecular weight in the range of 200–5600. The polymer and oligomer are blended (or mixed) together, so that the oligomer is uniformly distributed throughout the polymer. The blends may comprise less than 50% by weight oligomer, most preferred are in the range of 2–40%. Oligomer is chosen so that it is easily blendable with the polymer.

Examples of the foregoing membranes are set forth below.

EXAMPLES

The following examples utilized the ingredients set out in Table 1. Percentage (%) refers to "weight percent" or "percent by weight."

TABLE 1

| Polymer | Density | Melt Temperature (° C.) | Percent Crystallinity |
|---|---|---|---|
| HDPE1[1] | 0.96 | 135 | 76 |
| HDPE2[2] | 0.96 | 134 | 78 |
| Oligomer[3] | | | |
| PEWax 1500 | 0.96 | 119 | 100 |
| PEWax 1000 | 0.96 | 111 | 93 |
| PEWax 850 | 0.96 | 105 | 99 |
| PEWax 725 | 0.95 | 101 | 89 |
| PEWax 655 | 0.94 | 94 | 98 |
| PEWax 600 | 0.94 | 89 | 95 |

[1]Fina 7208 commercially available from Fina Oil and Chemical Co. of Dallas, Texas.
[2]Escorene 7845 commercially available from Exxon Chemical Co. of Houston, Texas.
[3]PEWax's are commercially available from Baker Petrolite Polymer Division Co. of Sugar Land, Texas.

Thirty percent by weight PEWax 1000 was hand mixed with 70% HDPE1. The blend was extruded at 190° C. to form a film. The film was annealed at 100° C. for 10 minutes then stretched on an Instron at 95° C. The results are set out in Table 2.

TABLE 2

| | Thickness (mil) | Gurley (sec) | Porosity (%) | Shutdown Temperature (° C.) |
|---|---|---|---|---|
| 100% HDPE1 | 0.64 | 54 | 30 | 130 |
| Blend | 0.50 | 45 | 35 | 121 |

Thirty percent (30%) oligomer/70% polymer blend films are made by an extrude/anneal/stretch (i.e., dry stretch) process. The results are set out in Table 3.

TABLE 3

| | Thickness (mil) | Gurley (sec) | Shutdown Temperature (° C.) |
|---|---|---|---|
| 100% HDPE1 | 0.65 | 21 | 130 |
| 30% PEWax 1000/70% HDPE1 | 0.47 | 13 | 115 |
| 30% PEWax 1000/70% HDPE1 | 0.60 | 14 | 117 |
| 100% HDPE2 | 0.82 | 42 | 130 |
| 30% PEWax 1000/70% HDPE2 | 0.88 | 25 | 116 |
| 30% PEWax 1000/70% HDPE2 | 0.96 | 34 | 118 |

The effect of different concentrations of oligomer on the blend are set in Table 4.

TABLE 4

| | Thickness (mil) | Gurley (sec) | Shutdown Temperature (° C.) |
|---|---|---|---|
| 10% PEWax 1000/90% HDPE1 | 0.78 | 22 | 125 |
| 20% PEWax 1000/80% HDPE1 | 0.70 | 31 | 123 |
| 30% PEWax 1000/70% HDPE1 | 0.52 | 24 | 122 |
| 40% PEWax 1000/60% HDPE1 | 0.58 | 33 | 121 |

The effect of oligomer variants on shutdown temperature are set out in Table 5.

TABLE 5

| | Thickness (mil) | Gurley (sec) | Shutdown Temperature (° C.) |
|---|---|---|---|
| 30% PEWax 1500/70% HDPE1 | 0.57 | 13 | 124 |
| 30% PEWax 1000/70% HDPE1 | 0.70 | 31 | 122 |
| 30% PEWax 725/70% HDPE1 | 0.92 | 42 | 122 |
| 30% PEWax 600/70% HDPE1 | 0.64 | 19 | 120 |

The effect of multi-component oligomers on shutdown temperature are set out in Table 6.

TABLE 6

| | Thickness (mil) | Gurley (sec) | Shutdown Temperature (° C.) |
|---|---|---|---|
| 15/15 PEWax 725/850/70% HDPE1 | 0.85 | 44 | 123 |
| 10/10/10 PEWax 655/725/1000/70% HDPE1 | 0.46 | 18 | 123 |
| 10/10/10/10 PEWax 655/725/850/1000/60% HDPE1 | 0.52 | 24 | 119 |

A 30% PEWax 1000 and 70% HDPE2 blend was extruded, annealed, and stretched to obtain:

| | Thickness (mil) | Gurley (sec) | Shutdown Temperature (° C.) |
|---|---|---|---|
| 30% PEWax 1000/70% HDPE2 | 1.06 | 20 | 119 |

A polypropylene/polyethylene/polypropylene (i.e., 8 microns thick polypropylene) trilayer (like Celgard 2300) was made except the center layer was replaced with a 30% PEWax 1000/70% HDPE1 blend to obtain:

| | Thickness (mil) | Gurley (sec) | Shutdown Temperature (° C.) |
|---|---|---|---|
| Trilayer | 0.93 | 44 | 125 |

The present invention may be embodied in other specific forms without departing from the spirit or essential attributes thereof and, accordingly, reference should be made to the appended claims, rather than to the foregoing specification, as indicating the scope of the invention.

What is claimed is:
1. A battery separator for a lithium rechargeable battery comprising a microporous polyolefinic membrane having a shutdown temperature of less than about 130° C., a porosity in a range of 30–80%, an average pore size in a range of 0.02–2.0 microns, and being made from a blend of a medium molecular weight high density polyethylene polymer and a polyethylene wax, and said wax comprising at least 20% by weight of said blend and less than or equal to 50% by weight of said blend.

2. The separator according to claim 1 wherein said separator having a thickness less than 3 mils.

3. The separator according to claim 1 wherein said membrane being one layer of a multilayered separator.

4. The separator according to claim 1 wherein said oligomer being a polyethylene wax having a molecular weight less than 6000.

5. A battery comprising:

an anode;

a cathode;

a separator according to claim 1, said separator being disposed between said anode and said cathode; and an electrolyte in ionic communication with said anode and said cathode via said separator.

6. The battery according to claim 5 being a lithium battery.

7. The battery separator according to claim 1 wherein a breadth of a temperature response for said shutdown being 4–5° C.

8. The battery separator according to claim 1 wherein said shutdown temperature being less than about 123° C.

9. The battery separator according to claim 1 wherein said shutdown temperature being less than about 120° C.

* * * * *